(12) United States Patent
Brief et al.

(10) Patent No.: US 11,030,007 B2
(45) Date of Patent: Jun. 8, 2021

(54) MULTI-CONSTRAINT DYNAMIC RESOURCE MANAGER

(71) Applicant: Western Digital Technologies, Inc., San Jose, CA (US)

(72) Inventors: David Chaim Brief, Modiin (IL); Yoav Markus, Tel-Aviv (IL); Shemmer Choresh, Tel-Aviv (IL)

(73) Assignee: WESTERN DIGITAL TECHNOLOGIES, INC, San Jose, CA (US)

( * ) Notice: Subject to any disclaimer, the term of this patent is extended or adjusted under 35 U.S.C. 154(b) by 201 days.

(21) Appl. No.: 15/847,389

(22) Filed: Dec. 19, 2017

(65) Prior Publication Data

US 2019/0188040 A1 Jun. 20, 2019

(51) Int. Cl.
*G06F 9/50* (2006.01)
*G06F 11/10* (2006.01)
*G06F 11/30* (2006.01)

(52) U.S. Cl.
CPC .......... *G06F 9/5016* (2013.01); *G06F 9/5022* (2013.01); *G06F 11/1068* (2013.01); *G06F 11/3037* (2013.01); *G06F 11/3051* (2013.01)

(58) Field of Classification Search
CPC .............. G06F 9/5016; G06F 11/3051; G06F 11/1068; G06F 11/3037; G06F 9/5022; G06F 9/5005
See application file for complete search history.

(56) References Cited

U.S. PATENT DOCUMENTS

| 6,895,016 B1* | 5/2005 | Nguyen | H04J 3/17 370/437 |
|---|---|---|---|
| 2003/0117958 A1* | 6/2003 | Nation | H04L 49/90 370/235 |
| 2006/0005082 A1* | 1/2006 | Fossum | G06F 1/3203 714/42 |
| 2013/0227236 A1* | 8/2013 | Flynn | G11C 16/26 711/165 |
| 2013/0311822 A1* | 11/2013 | Kotzur | G06F 11/0727 714/6.22 |
| 2016/0070652 A1* | 3/2016 | Sundararaman | G06F 3/0619 711/154 |
| 2018/0018101 A1* | 1/2018 | Benisty | G06F 3/0656 |

* cited by examiner

*Primary Examiner* — Theodore C Parsons
*Assistant Examiner* — Bruce S Ashley
(74) *Attorney, Agent, or Firm* — Patterson & Sheridan, LLP; Steven H. Versteeg

(57) ABSTRACT

An arrangement is illustrated wherein a flash controller with a multi-constraints dynamic resource manager module configured to control both software and hardware clients is provided. The arrangement also provides for memory and an interface for connecting the controller to a host.

23 Claims, 3 Drawing Sheets

MULTI-CONSTRAINT DYNAMIC RESOURCE MANAGER

FIELD OF THE DISCLOSURE

Aspects of the disclosure relate to efficient use of resources in System on Chip (SOC) devices. More specifically, aspects described relate to allocation and deallocation of resources between firmware processing on different threads, processors and hardware cores.

BACKGROUND

Field

Efficient use of on-chip resources is a constant concern of architecture engineers. In typical architecture for SOC devices, processing allocation and deallocation of resources occurs on an as needed basis. Such allocation and deallocation of resources often involves creating latencies in overall response time. As SOC architectures are cost sensitive, efficient use of on-chip resources is necessary. Conventional architectures do not have a single arrangement for transitioning resources or components. Architectures, therefore, may have a large number of individual controllers that each need dedicated resources, resulting in an inefficient architecture.

For example, random read benchmark performance accounts for parallelism in the execution of read commands initiated by a host, such as a computer or server. The host may issue commands to send and receive data from a data storage mechanism. The data storage mechanism may be a computer hard disk, solid state drive (SSD) or other memory configuration that allows a user to send and receive information for processing. Conventionally, systems that are used in the manner do not fully utilize the inherent computer parallelism architecture as the software used to control the hardware is not optimal. Computer and component manufacturers desired to increase computer performance to the maximum amounts possible to allow a computer users experience to be improved. Latency or computer lag during computer operations is attempted to be minimized wherever possible.

In conventional computer functions, the read location for data is obtained according to a translation of the physical location. This physical location was obtained and memorized during a previous write operation. During certain computer actions, both write and read operations are not efficiently scheduled and thus, actions are not performed efficiently. Such inefficiencies may include, for example, deadlock conditions that negatively impact computer operation.

From a numerical perspective, die operations are not equal between different dies when the queue depth (QD), defined as the amount of read commands provided by the host to execute in parallel, is similar to the number of dies. As a result, when the read commands provided to the die configuration equals or is nearly equal to the number of dies, parallelism execution is compromised and the executed read commands are performed inefficiently as there is time lag associated with execution of serial commands. For activities where there is a limited number of read commands, there is a high probability of some dies having stacked operations while other dies are idle. Thus, for a small number of write operations, there is a high likelihood of some dies being sufficiently busy, while other dies are inactive.

There is a need to avoid computer deadlock conditions where both read and writes are waiting for buffer opportunities.

There is a need, therefore, to provide a method that will efficiently allocate resources to needed areas within a SOC architecture.

There is a further need to provide a method that will efficiently deallocate resources to operations that do not need resources in a SOC architecture.

There is a still further need to provide an arrangement that interfaces with other computer systems and architectural components so that the needs of the computer systems and architectural components are not starved for resources, while allowing, to the greatest extent, remaining resources to be utilized.

SUMMARY

So that the manner in which the above recited features of the present disclosure can be understood in detail, a more particular description of the disclosure, briefly summarized below, may be had by reference to embodiments, some of which are illustrated in the appended drawings. It is to be noted that the appended drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, an arrangement is disclosed comprising a flash controller with a multi-constraints dynamic resource manager module configured to control both software and hardware clients.

In another non-limiting embodiment, a method of controlling equipment is disclosed comprising: receiving a plurality of task execution requests at a flash controller, monitoring available resources in a host and allocating at least a minimal amount of resources required per request to each request.

In another non-limiting embodiment, an arrangement is disclosed comprising means for receiving a plurality of task execution requests at a flash controller, means for monitoring resources in a host and means for allocating at least a minimal amount of resources per request.

Other aspects and advantages will become apparent from the following description and the attached claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
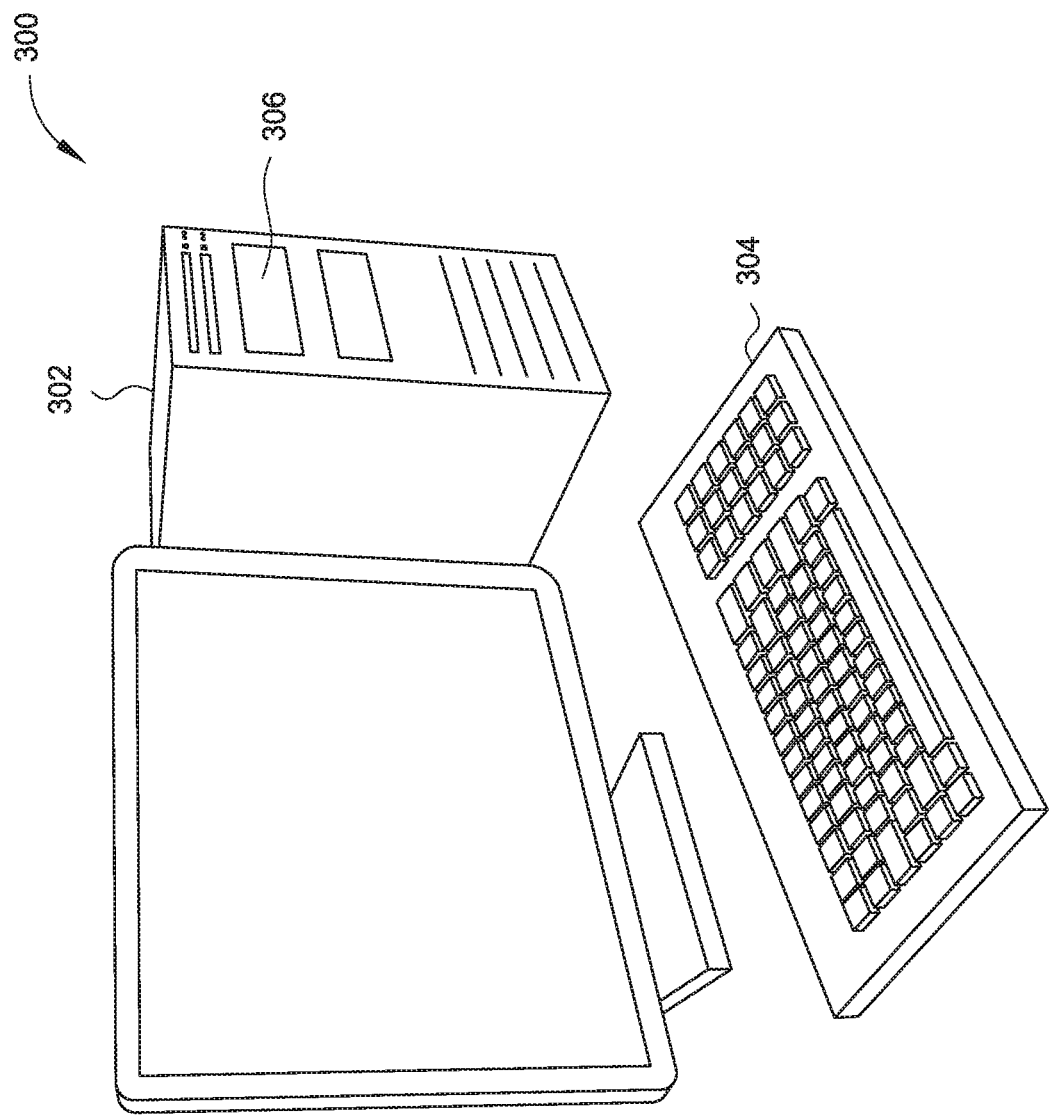
FIG. 1 is a block diagram of a host and controller configuration.

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim. Likewise, reference to "the disclosure" shall not be construed as a generalization of an inventive subject matter disclosed herein and shall not be considered to be an element or limitation of the appended claims except where explicitly recited in a claim.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage. In the embodiments described, a data storage arrangement is connected to a host system. The function of the data storage arrangement is to accept data and store the data until needed again by a user or the host. The data storage arrangement may have to accept large bursts of data at a rapid pace, depending on the computer process performed, therefore the data storage arrangement is configured with multiple memory units that provide for various states of usage. Certain sections of the data storage arrangement are configured of memory systems that provide for fast action (low latency) so that computer processes may be conducted at a rapid pace. Such low latency action may be accomplished by single layer cell memory configurations. If bulk amounts of data are required to be stored, multiple layer cell memory configurations are also present, such as triple level cell memory configurations. The data storage arrangement may have an interface that allows the data storage arrangement to connect with the host. The interface may be a SATA compatible interface, as a non-limiting embodiment. The memory storage may have a configuration to allow for plug and play ability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection. The description is not limited to SATA compatible interfaces as other interfaces such as UFS, UHS, PCIe-NVMe, SAS and others may also apply.

In some aspects described, dynamic allocation of buffers between read and write operations allows the reuse of buffers for both read and write operations as with typical systems, either a multitude of reads or writes are being performed, not both. In order to avoid deadlock conditions, aspects of the description provide for a pool of buffers. In one-non-limiting embodiment, a single pool of buffers is provided. In certain aspects a number of buffers may be allocated to read operations from each channel and a number of buffers may be allocated to write operations from each channel. The number of buffers for write operations may be chosen, for example, to allow for buffers for read operations. Such allocation of the number of buffers may be done, for example, on a dynamic basis. The allocation may take into account, for example, the optimal use of resources, without the need to allocate all or a maximum number of resources.

Regarding FIG. 1, and as described above, an illustration of a host 302 and device 306 in configuration 300 is provided. The host 302 is a computer that is provided with an interface 304 to allow a user to interact with the host 302. The interface 304 may be a keyboard and monitor system as a non-limiting embodiment. The host 302 provides a computing arrangement that allows for input, retention and output of information, as desired, from the request of a user. The device 306, is an arrangement that provides for retention of information, such as a data storage arrangement. In the illustrated embodiment, the device 306 is a non-volatile memory device, such as a NAND flash unit. The device 306 may have a host interface which is configured to interface with the host 302 to allow the device 306 to be addressable by the host 302.

The host 302 may have several configurations and the illustration provided is but one example embodiment. The host 302 may have a serial port, a parallel port, a fire-wire connection, Ethernet connection and/or multiple universal serial bus devices (USB's). The host 302 may have a processor that allows for computation of required processes. Video output may be provided such that a user can identify the results of processor actions. The output may be through a connected universal serial bus device or dedicated video output, through, for example, a video card and video monitor. The host 302 may also be provided with a printer output port to allow for printed output of the materials calculated.

The host 302 may also be provided with other input/output devices, such as a mouse, camera or other similar components. In the non-limiting embodiment, the host 302 is configured as a stand-alone unit. Such a stand-alone unit may be a laptop computer or may be a desktop computer unit. The host 302 may also be provided with an additive connection feature, such as a server/rack system. The host 302 may be one component in such a server and rack system.

The host 302 may be configured such that it is self-powered and can provide power to the other components attached to the host 302. In the illustrated embodiment, the host 302 is configured with the ability to provide power to the device 306.

Figure 2:
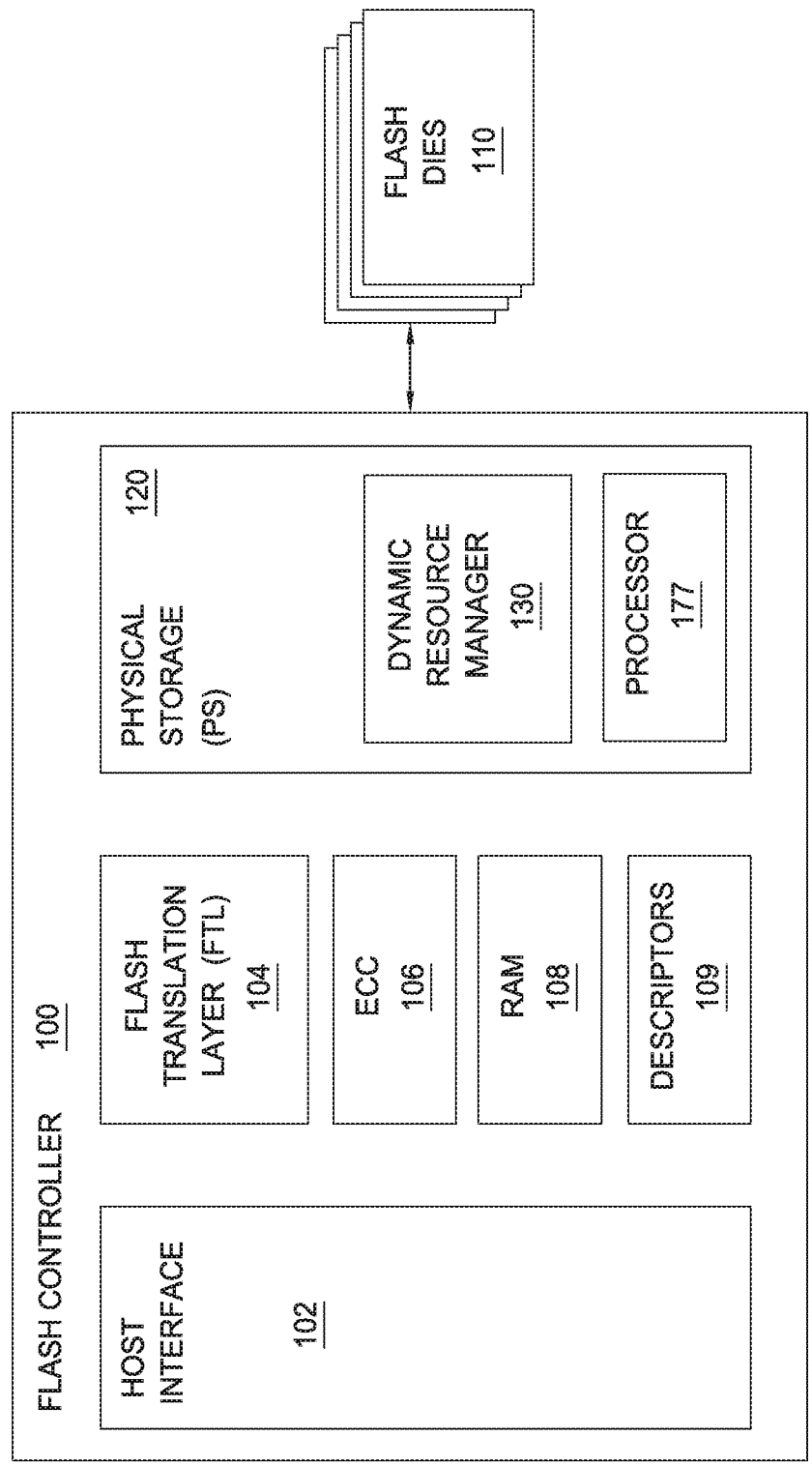
FIG. 2 is a block diagram of a flash controller including host interface, flash translation layer and physical storage arrangement in one non-limiting example embodiment described.

Referring to FIG. 2, a controller 100 is illustrated. The controller 100 is a device that is configured to control components that are connected to the controller 100. In the illustrated embodiment, the controller 100 is a flash controller placed on a card that provides a host interface 102, a flash translation layer (FTL) 104, an ECC 106, RAM 108, descriptors 109 and physical storage 120. A dynamic resource manager 130 connected to the physical storage 120. A dynamic resource manager 130 connected to the physical storage 120 may manage resources.

The flash controller 100 is configured to interface with flash dies 110, wherein the flash dies 110 may write and read information to the physical storage 120. A differing number of flash dies 110 may be proved helpful to provide a parallelism to reading and writing operations that use the physical storage. In the illustrated embodiment, the flash controller 100 may be configured to assign or de-assign tasks to the flash dies 110 as needed.

In the illustrated embodiment, the controller 100 is a system on chip (SOC) with multiple controllers and a high speed data path for transferring information to and from the host system. A host system may be a desktop computer, a laptop computer, a mobile phone, a server, a digital audio player, a digital video player or electronic playback device.

The SOC provides an efficient system that allows for available resources to be shared efficiently. The system on chip may also be configured to identify resources that may be added or altered on the system. Such capabilities for identifying changes to resources are advantageous, for example if additional RAM is provided to the controller 100. The additional RAM may then be used in computations that may be resource intensive.

For definition of the term resources, the controller is configured such that resources are RAM, descriptors, counters, time slots and power. For the purposes of definition a descriptor is a data structure that defines an operation to be performed by a hardware engine. Allocation and deallocation of an buffer for descriptors is also performed by the resource manager, and these descriptors may be shared among multiple engines As a non-limiting list of elements that require the resources described above, includes process running on one or more processors, dedicated data path elements such as controllers (i.e., an ECC controller), flash memory operations that require power and shared bus access.

In the illustrated embodiment, the dynamic resource manager 130 may provide unified access to resources for multiple clients. The access provided may be performed in a thread-safe manner among processor threads and hardware devices.

The controller 100 may also be configured to identify the minimum required resources and the maximum required resources for each component. By identifying the minimum and maximum required resources for each component, the controller 100 may prevent resource starving for the components.

The controller 100 may also be addressable such as a user may identify the properties to be controlled for the best user experience. In a non-limiting embodiment, a user may choose to minimize latency for components under control by the controller 100. The dynamic resource manager 130 may then allocate resources to various components where latency will be beneficially impacted to a maximum extent.

The physical storage 120 is configured as a removable unit that may be swappable at the needs of a user. The physical storage 120 is provided with an interface to allow the host to communicate with the physical storage 120 to send requests for information, such as a write or read. Individual dies may interact with the physical storage 120 such that parallelism is maintained to the greatest extent possible. The physical storage 120 may include a processor to allow for enhanced computer interaction and reduced latency. The processor 177 for the physical storage 120 is configured to interact with the flash controller 100 to enable the flash controller to address the status of the physical storage, such as the power needs of individual components of the physical storage unit. For instances, as a non-limiting example, where the physical storage 120 is idle, the flash controller 100 may limit the overall power provided to the physical storage 120. In other instances, resources, such as sending write and read requests to individual dies may also be not only monitored but controlled with the flash controller 100. In another non-limiting example embodiment, the flash controller 100 is configured to monitor multiple dies and the requests as well as data packets being processed through the dies. If one specific die or multiple dies may be receiving excessive duty, then dies that are not currently as busy or active, may be scheduled to undertake further actions in place of dies that are receiving excessive duty. To accomplish this, a buffer memory may be created to allow a processor for the flash controller 100 to take data packets from the buffer memory and schedule the processing of the data packets for processing at different die.

In another non-limiting embodiment, the physical storage may be provided with a buffer memory. The buffer memory may be used to retain data that is recalled by a host on a frequent basis. In the case of NAND flash units being used as the physical storage 120, a limited cycle duty is present in the number of writes and erases that can be performed by the physical storage 120. Over a certain threshold, every write or erase from the physical storage 120 has the increased possibility of having an error. To minimize the possibility of having these errors occur, a buffer may be provided for the physical storage. Data tags may be applied to the pieces of data to be stored. These data tags may indicate if the data that is to be stored is need on a more frequent basis.

For data that is needed on a more frequent basis, the data may be stored in a conventional random access memory (RAM).

Figure 3:
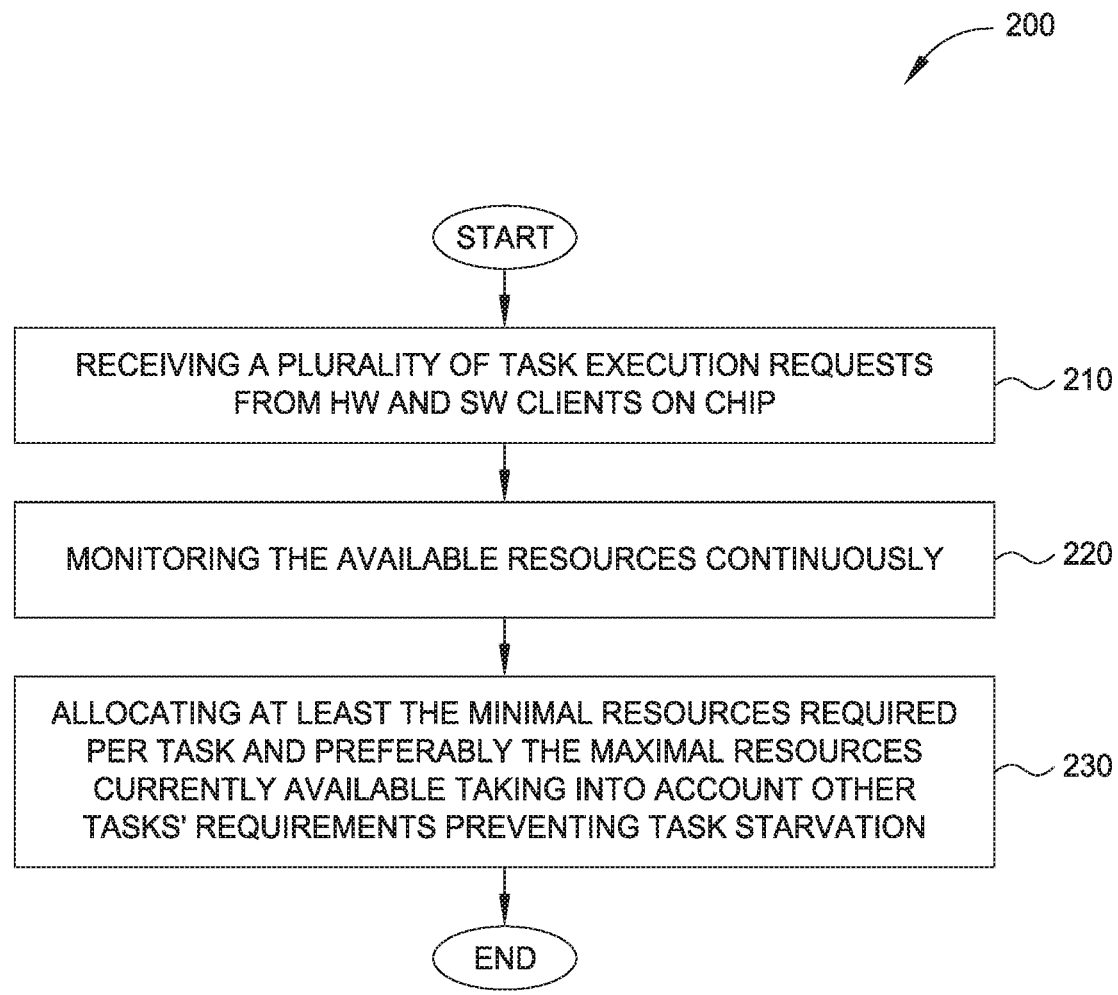
FIG. 3 is a method for multi-constraints dynamic resource management.

Referring to FIG. 3, a method 200 for multi-constraints dynamic resource management are provided. At 210, a plurality of task executions requests from hardware and/or software clients are received on chip. At 220, the available resources are monitored. The monitoring at 220 may be on a continuous or a non-continuous basis. At 230, resources may be allocated that are required. Minimal resources may be allocated or, in another embodiment, maximal resources may be provided taking into account other task requirements, thereby preventing task starvation.

In the method 200 for providing dynamic resource management for multi-constraints may be augmented in several possible alternative steps to allow the user freedom of use. As provided, a user may be provided with a choice of resources that may be allocated by the multi-constraints dynamic resource management system. A user may elect, for example, low latency as a prime characteristic upon which to have the multiple components operate. In such an alternative, the flash controller 100 may operate to provide low latency as a primary function. As will be understood, other alternatives may be possible. The flash controller 100 may also be placed on a schedule operation where different primary functions are chosen for implementation at different times. In instances with continuing computer operations, certain functions or capabilities may be more necessary than others given a specific schedule. A resource may be defined as a physical component or a virtual component within a computer arrangement. Flows within a resource are operations that are proceeding within the physical or virtual component. As a result, different flows may be present in a single resource. Differing flows, therefore, may compete or be present in a resource at one time.

In one non-limiting embodiment, there are four (4) types of resources that may be allocated by the multi-constraint dynamic resource manager, namely the data buffer RAMs for reads and writes, the descriptors for control structure that describe hardware operations, the flow control counters and other related dynamic buffers. These resources are all allocated and deallocated between processors and between hardware engines to allow for optimal use of on-chip resources. In other embodiments, the resources may be allocated statically or may be allocated by firmware in a single core. This approach allows for use of resources "just in time" to allow for better use of these resources in terms of sharing and utilization.

In another example embodiment, when reading data, a buffer is allocated to place decoded data. The decoded data is then sent to a host, namely a personal computer or server. After the data has been sent to the host, it may automatically be de-allocated.

In one non-limiting embodiment, an arrangement is disclosed comprising a flash controller with a multi-constraints dynamic resource manager module configured to control both software and hardware clients.

In another non-limiting embodiment, the arrangement is disclosed wherein the module is configured to determine a maximum amount of resources to be provided to each client.

In another non-limiting embodiment, the arrangement is disclosed wherein the module is further configured to identify changes in hardware and software in a host and the controller.

In another non-limiting embodiment, the arrangement is disclosed wherein the module further comprises at least one processor.

In another non-limiting embodiment, the arrangement is disclosed wherein the module is configured to maintain a power budget for each component controlled by the controller.

In another non-limiting embodiment, the arrangement is disclosed further comprising a host interface configured to transmit and receive data from a host.

In another non-limiting embodiment, the arrangement further comprises a flash translation layer.

In another non-limiting embodiment, the arrangement further comprises a random access memory.

In another non-limiting embodiment, the arrangement further comprises a physical storage configured to receive, store and retrieve data.

In another non-limiting embodiment the arrangement is configured such that the physical storage is one of a NAND flash unit, a disk drive and a hybrid drive.

In another non-limiting embodiment, the arrangement further comprises an ECC.

In another non-limiting embodiment, the arrangement further comprises descriptors.

In another non-limiting embodiment, a method of controlling equipment is disclosed comprising: receiving a plurality of task execution requests at a flash controller, monitoring available resources in a host and allocating at least a minimal amount of resources required per request to each request.

In another non-limiting embodiment, the method may be provided wherein the monitoring of the available resources is performed continuously.

In another non-limiting embodiment, the method may be performed wherein the allocating the at least minimal amount of resources is allocating a maximum resources currently available.

In another embodiment, the method may be performed wherein the receiving the plurality of task execution requests is from at least one of a hardware component and software.

In another non-limiting embodiment, an arrangement is disclosed comprising means for receiving a plurality of task execution requests at a flash controller, means for monitoring resources in a host and means for allocating at least a minimal amount of resources per request.

In another non-limiting embodiment, the arrangement is disclosed, wherein the means for monitoring resources in the host performs on a continual basis.

In another non-limiting embodiment, the arrangement is disclosed wherein the means for allocating the at least the minimal amount of resources further compresses a means to provide a maximum amount of resources available.

In another non-limiting embodiment, the arrangement is provided wherein the request is from at least one of hardware components and software.

In another non-limiting embodiment, the arrangement further comprises means for monitoring and controlling an arrangement of descriptors.

In another non-limiting embodiment, the arrangement further comprises means for providing a memory arrangement.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. An arrangement configured to couple to a host, the arrangement comprising: a controller comprising:
    a removable physical storage unit comprising one or more buffers;
    random access memory (RAM); and
    a multi-constraints dynamic resource manager module configured to control both software clients and hardware clients, wherein the multi-constraints dynamic resource manager module is connected to the removable physical storage unit, and wherein the multi-constraints dynamic resource manager module is configured to:
        allocate and deallocate resources selected from the group comprising the RAM, data buffers for reads and writes, descriptors, flow control counters, dynamic buffers, and time slots; and
        allocate and deallocate the resources to control a power budget of the arrangement or to minimize latency of a task executing on the arrangement.

2. The arrangement according to claim 1, wherein the module is further configured to determine a maximum amount of resources to be provided to each client.

3. The arrangement according to claim 1, wherein the module is further configured to identify changes in hardware and software in the host and the controller.

4. The arrangement according to claim 1, wherein the module comprises at least one processor.

5. The arrangement according to claim 1, wherein the module is further configured to maintain a power budget for each component controlled by the controller.

6. The arrangement according to claim 2, further comprising:
a host interface configured to transmit data to and receive data from the host.

7. The arrangement according to claim 6, wherein the controller further comprises a flash translation layer.

8. The arrangement according to claim 7, further comprising one or more flash dies coupled to the controller.

9. The arrangement according to claim 8, wherein the removable physical storage unit is configured to receive, store, and retrieve data.

10. The arrangement according to claim 9,
wherein the removable physical storage unit is one of a NAND flash unit, a disk drive, and a hybrid drive.

11. The arrangement according to claim 10, wherein the controller further comprises an Error Correction Code (ECC).

12. The arrangement according to claim 11, wherein the controller further comprises descriptors, wherein a descriptor is a data structure that defines an operation to be performed by hardware.

13. The arrangement according to claim 1, wherein the multi-constraints dynamic resource manager module is further configured to allocate and deallocate the resources to reduce task starvation of the arrangement or to perform just-in-time allocation of the resources of the arrangement.

14. A method of controlling equipment, comprising:
receiving a plurality of task execution requests at a flash controller, the flash controller comprising RAM, a multi-constraints dynamic resource manager module, and a removable physical storage unit comprising one or more buffers;
monitoring available resources in a host, the host being coupled to the flash controller; and
allocating at least a minimal amount of resources required per request to each request using the multi-constraints dynamic resource manager module, wherein the multi-constraints dynamic resource manager module is connected to the removable physical storage unit, and wherein the multi-constraints dynamic resource manager module is configured to:
allocate and deallocate resources selected from the group comprising the RAM, data buffers for reads and writes, descriptors, flow control counters, dynamic buffers, and time slots; and
allocate and deallocate the resources to control a power budget of the equipment or to minimize latency of a task executing on the equipment.

15. The method according to claim 14, wherein the monitoring of the available resources is performed continuously.

16. The method according to claim 14, wherein the allocating the at least minimal amount of resources is allocating a maximum resources currently available.

17. The method according to claim 14, wherein the receiving the plurality of task execution requests is from at least one of a hardware component and software.

18. An arrangement configured to couple to a host, the arrangement comprising:
means for receiving a plurality of task execution requests at a flash controller, the flash controller comprising RAM and a removable physical storage unit comprising one or more buffers;
means for monitoring resources in the host; and
means for allocating at least a minimal amount of resources per request, wherein the means for allocating at least the minimal amount of resources per request is connected to the removable physical storage unit, and wherein the means for allocating at least the minimal amount of resources per request is configured to:
allocate and deallocate resources selected from the group comprising the RAM, data buffers for reads and writes, descriptors, flow control counters, dynamic buffers, and time slots; and
allocate and deallocate the resources to control a power budget of the arrangement or to minimize latency of a task executing on the arrangement.

19. The arrangement according to claim 18, wherein the means for monitoring resources in the host performs on a continual basis.

20. The arrangement according to claim 19, wherein the means for allocating the at least the minimal amount of resources further comprises a means to provide a maximum amount of resources available.

21. The arrangement according to claim 18, wherein the request is from at least one of hardware components and software.

22. The arrangement according to claim 18, further comprising means for monitoring and controlling an arrangement of descriptors.

23. The arrangement according to claim 18, further comprising means for providing a memory arrangement.

\* \* \* \* \*